UNITED STATES PATENT OFFICE.

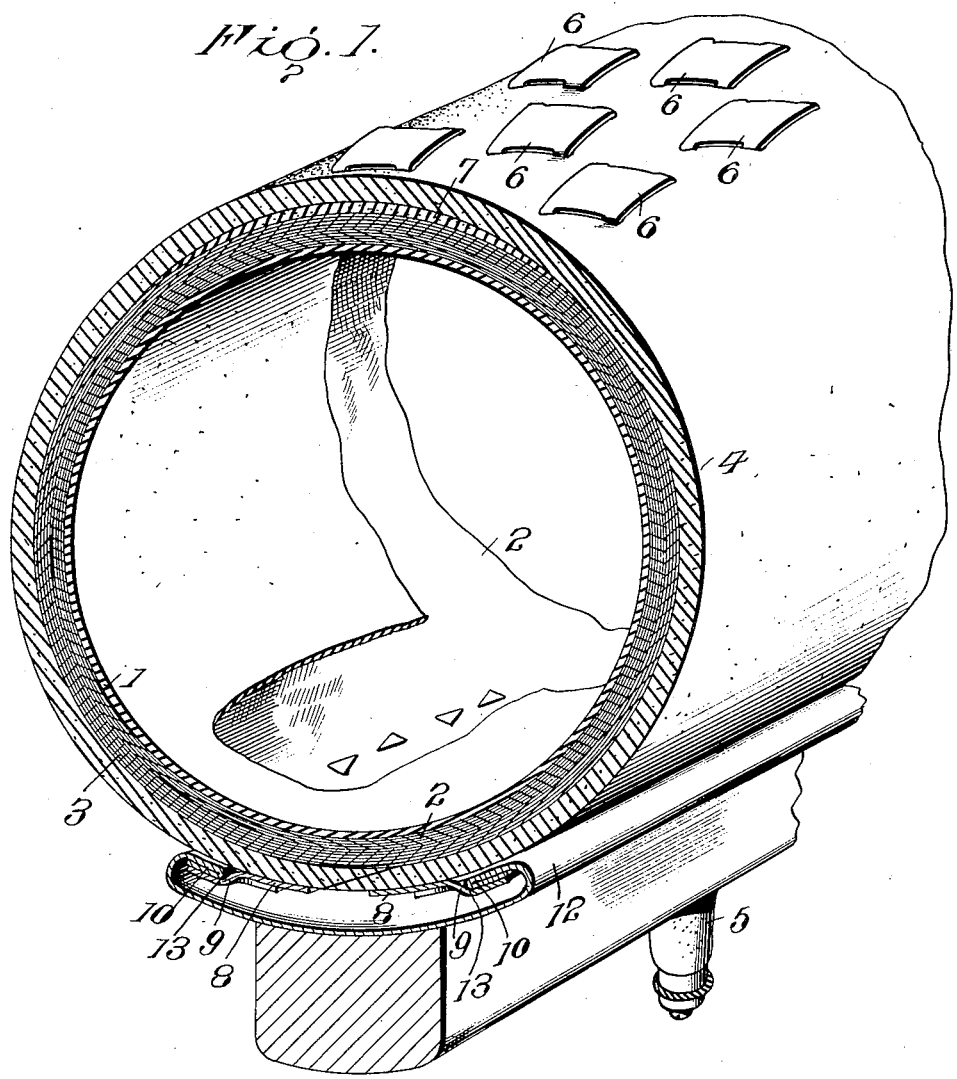
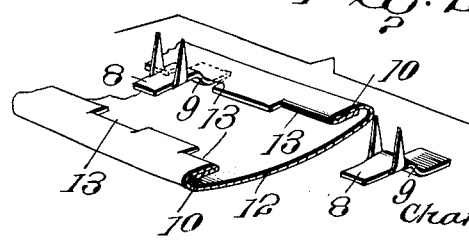

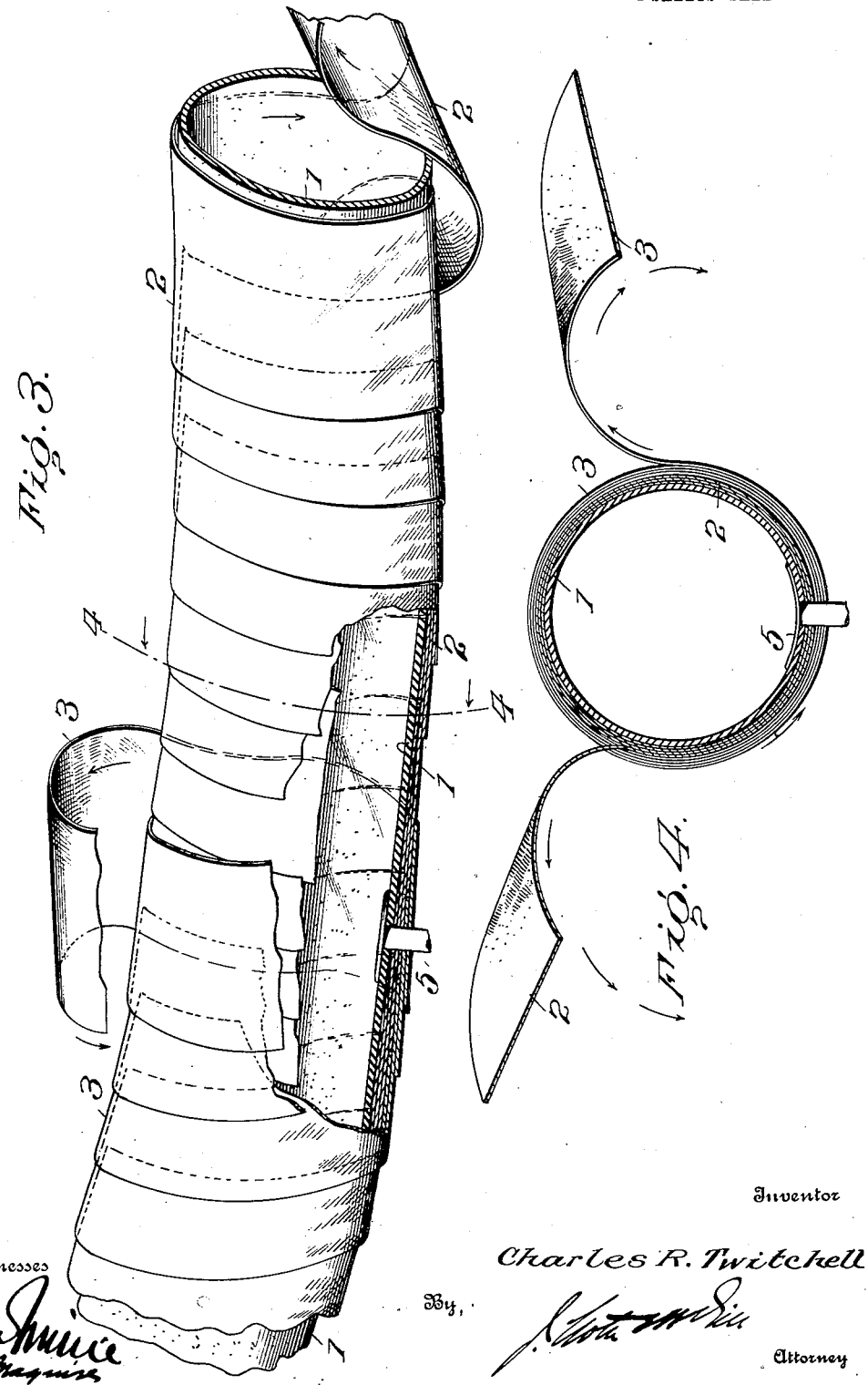

CHARLES R. TWITCHELL, OF LOS ANGELES, CALIFORNIA, ASSIGNOR OF ONE-HALF TO JAMES M. BRENNAN, OF LOS ANGELES, CALIFORNIA.

PNEUMATIC TIRE.

No. 824,604.  Specification of Letters Patent.  Patented June 26, 1906.

Application filed September 25, 1905. Serial No. 280,029.

*To all whom it may concern:*

Be it known that I, CHARLES R. TWITCHELL, of Los Angeles, in the county of Los Angeles and State of California, have invented certain new and useful Improvements in Pneumatic Tires; and I do hereby declare the following to be a full, clear, and exact description of the invention, such as will enable others skilled in the art to which it appertains to make and use the same.

Hitherto shoes or casings of pneumatic tires composed entirely of leather have been found impracticable primarily because of the tendency of the leather to distend unevenly, resulting sooner or later in complete rupture or blow-outs.

The primary object of the present invention is to obviate this difficulty, and thereby enable me to employ a casing composed wholly of leather, which is far preferable to any other material or combination of materials heretofore employed in the manufacture of pneumatic tires, since it does not require reinforcements and is not liable to break out contiguous to the wheel-rims, as occurs with fabric-reinforced rubber tires. Punctures in inner tubes are more frequently due to contact between the tube and some sharp edge or ridge of the casing than to external agencies. This also I seek to overcome and by the same means that insures the retention of the shape of the casing.

The invention will be hereinafter fully set forth, and particularly pointed out in the claims.

In the accompanying drawings, Figure 1 is a sectional view in perspective with parts broken away. Fig. 2 is an enlarged view of a section of a wheel-rim, together with the hooks for securing the casing thereto. Fig. 3 is a fragmentary view showing the manner in which the tube is wrapped, parts being in section and parts broken away. Fig. 4 is a transverse sectional view on line 4 4, Fig. 3, looking in the direction of the arrows.

According to my invention I wrap the inner air-tube while on a mandrel with a continuous strip of light firm canvas or other suitable fabric in helical form, the strip being untreated and unsecured to the tube, save that its ends and contiguous convolutions are preferably held by engagement with the valve-housing. This first strip is covered with a second one of the same material; but it is wound in opposite direction to the first strip, its ends being similarly held. In other words, one strip is wound to the right and the other to the left. Whatever take-ups have to be made in the strips to allow of their being spirally wound the same are always over the inner face of the tube. When the tube has been properly wound, with the helically-arranged strips carried in opposite directions, the whole is placed within the casing, which is made of leather and equipped with means for interlocking with the wheel-rim, as pointed out in my application for patent Serial No. 266,152. In practice any tendency of any portion of the inner tube to move relatively to the casing or any portion of the casing to the tube is entirely offset by the two helical wrappings, since any movement tending to disturb some one or more of the convolutions of one wrapping will be immediately offset by the corresponding or intersecting convolutions of the other wrapping. In consequence of the helical wrappings having each a countervailing action on the other and the outer of them being in contact with the inclosing casing not only is the creeping of the tube impossible, but the casing itself is prevented from spreading or distending at any point, since should any part thereof tend to distend it will be immediately arrested by the engagement of those portions of the outer wrapping at opposite points of or surrounding such part of the casing, any give of the outer wrapping being prevented by the inner wrapping.

In the drawings I have shown the inner tube at 1, the inner wrapping of canvas at 2, the outer canvas wrapping at 3, and the leather casing at 4. Both windings are preferably commenced at the valve-housing 5, so that the first and the final four or five convolutions of each wrapping will be caused to engage said housing, so as to be held thereby. Other means may be employed for holding the wrappings; but the latter must not be secured to the tube as to form part thereof, nor must either wrapping be secured to or made practically part of the other wrapping. The winding of the strips is preferably performed on a mandrel of about one-half the circumference of the tube when inflated, the tube being flattened against the under side of the mandrel. The wrapped section of the tube is gradually slid along and off the mandrel as the wrapping progresses.

I have shown the leather casing as of substantially uniform thickness at every point, save that when equipped with non-skidding plates 6 along its tread it is preferably provided with an inner layer 7 of leather; but otherwise there is no building up or reinforcing of the casing. The latter near its edges is equipped with metallic hooks 8, having outer portions flared away from the inner attached portions, so that the intermediate connecting portions 9 will alone engage with the flanged edges 10 of the wheel-rim 12, thus avoiding the necessity of any engagement between the casing and the rim to hold the former in place. The rim-flanges are preferably formed with recesses 13 to accommodate the hooks, such recesses serving as an additional guard against creeping of the casing. I have found that creeping is largely due to the reinforced portions of casings, which being in contact with the rims tend to cause the casings to creep in consequence of the constant forward strain thereon; but with casings not having such reinforcements this is not liable to happen.

By means of my invention the inner tube may with perfect safety be carried folded flat upon itself, the loose wrappings forming a complete protection therefor as against chafing, &c., and, furthermore, such wrappings being themselves free of all rubber compositions or other analogous treatment cannot be readily injured and not being secured to the tube cannot impair the latter in folding. To insert the tube, the casing is entirely removed, (which may be done in a very short time without the use of tools of any kind,) whereupon the tube and its inclosing wrappings are opened out and pressed flat within the casing without danger of being twisted or otherwise imperfectly inserted. The casing is then replaced, the hooks being caused to engage the rim-flanges in the manner recited. The tube may then be inflated without fear of being pinched by the casing or of any puncture being formed by contact with any edge of the casing or any uneven surface therein. The tube is, in fact, so completely enveloped and protected by the textile wrappings that there is not the slightest danger of any undue slipping between it and the casing; but actual practice has demonstrated that the greatest advantage arising from my invention resides in the effect on the leather casing of a double wrapping, since no matter how severe the usage the casing always retains its proper shape, any distention at any one point being arrested by the double wrappings of the tube. To secure this result, however, it is essential that the wrappings be loose—that is, in the sense that they must not be secured to each other nor to the tube or casing.

I claim as my invention—

1. A pneumatic tire comprising an outer casing, an inner air-tube, and a covering for the latter composed of wrappings of textile material helically wound thereon, said wrappings being wound in opposite directions and unsecured to the tube.

2. A pneumatic tire comprising an outer casing, an inner air-tube, and a covering for the latter composed of wrappings of textile material helically wound thereon, said wrappings being wound in opposite directions and unsecured to the tube and to each other.

3. A pneumatic tire comprising an outer casing of leather, an inner air-tube of rubber, and a covering for the latter composed of two wrappings of textile material helically wound thereon, said wrappings being wound in opposite directions and both unsecured to the tube.

4. A pneumatic tire comprising an outer casing of leather, an inner air-tube of rubber, and a covering for the latter composed of two wrappings of textile material helically wound thereon, said wrappings being wound in opposite directions and both unsecured to the tube and to each other.

5. A pneumatic tire comprising an outer casing of leather, an inner air-tube having a valve-housing, and a covering for the air-tube composed of two wrappings of textile material helically wound thereon and at their ends engaging said valve-housing, said wrappings being wound in opposite directions.

6. In a pneumatic tire, having an inner air-tube and an outer casing, an inclosure for such air-tube composed of two layers of textile material helically and loosely wound in opposite directions, such material forming no part of the tube or the casing.

In testimony whereof I have signed this specification in the presence of two subscribing witnesses.

CHARLES R. TWITCHELL.

Witnesses:
   VERNON E. WEST,
   JOHN A. MURPHY.